(12) United States Patent
Chen et al.

(10) Patent No.: US 8,019,485 B2
(45) Date of Patent: Sep. 13, 2011

(54) SYSTEM AND METHOD FOR CONTROLLING THE PERFORMANCE OF A POWER GENERATING SYSTEM

(75) Inventors: Dingguo Chen, Eden Prairie, MN (US); Haso Peljto, Brooklyn Park, MN (US)

(73) Assignee: Siemens Energy, Inc., Orlando, FL (US)

( * ) Notice: Subject to any disclaimer, the term of this patent is extended or adjusted under 35 U.S.C. 154(b) by 1850 days.

(21) Appl. No.: 11/157,056

(22) Filed: Jun. 20, 2005

(65) Prior Publication Data
US 2006/0041405 A1   Feb. 23, 2006

Related U.S. Application Data

(60) Provisional application No. 60/581,779, filed on Jun. 22, 2004, provisional application No. 60/581,780, filed on Jun. 22, 2004.

(51) Int. Cl.
*G05D 3/12* (2006.01)
*G05B 11/01* (2006.01)
*G06F 7/60* (2006.01)
*G06F 19/00* (2011.01)

(52) U.S. Cl. ............... 700/295; 700/14; 700/22; 700/29; 700/51; 703/2; 702/181

(58) Field of Classification Search ............ 700/14, 700/22, 28–31, 33, 51, 55, 286, 287, 289, 700/290, 297, 298, 295; 702/181, 182; 703/2, 703/18
See application file for complete search history.

(56) References Cited

U.S. PATENT DOCUMENTS 5,555,191 A * 9/1996 Hripcsak ................... 709/224
7,272,516 B2 * 9/2007 Wang et al. ................. 702/60

* cited by examiner

*Primary Examiner* — Sean P Shechtman

(57) ABSTRACT

A method and system for energy management in a power system. Target performance standards are calculated and used to measure performance and to comply with regulatory performance standards. The target performance standards are based on probability theory and are used to control power generation. The amount of corrective power necessary is based on the calculated target performance standards and the deviations of current performance values from the target standards.

21 Claims, 3 Drawing Sheets

SYSTEM AND METHOD FOR CONTROLLING THE PERFORMANCE OF A POWER GENERATING SYSTEM

CROSS-REFERENCE TO RELATED APPLICATIONS

This application claims priority to, and incorporates by reference in their entirety, provisional applications, Ser. Nos. 60/581,779, and 60/581,780 filed Jun. 22, 2004.

FIELD OF THE INVENTION

The present invention relates to a method and system for energy management in a power system. Target performance values are calculated and used to measure the performance of the power system and to comply with power regulatory performance standards. These target performance values are based on probability terms and are used to control power generation. The amount of corrective action or power control is based on the calculated target performance values and the deviations of these target performances value from measured performance values for a specific time interval.

BACKGROUND OF THE INVENTION

In the advent of deregulation, independent system operators (ISOs) are required to monitor and operate within certain power generation performance standards. These performance standards determine the amount of imbalance that is permissible for reliability on power systems. Currently, ISOs operate by reacting to power trends as well as scheduled power interchange. At the moment, operators provide regulatory agencies with schedule information detailing the quantity of energy and the time that energy will be produced. These schedules of energy vary over the course of a year, month, week, day, hour and other intervals of time such as seasons and special days such as holidays and weekends. Despite knowing that such energy requirements vary considerably at times, operators are often tasked with the burden of meeting demand for real-time and unanticipated shortage in energy. Meeting these unanticipated demands is often the cause of increased energy costs. Under certain circumstances, energy costs may decrease when an oversupply of energy exists in the marketplace.

As readily apparent, there is a significant need for a method and system which allows for compliance with the control performance standards set by regulatory authorities such as NERC (North American Electric Reliability Council). The present invention is a method and system for compliance with these control performance standards as well as being an energy management solution for energy producers.

SUMMARY OF THE INVENTION

The present invention is intended to provide a method and system by which energy producers are able to comply with regulatory performance objectives. These objectives are achieved by employing a method and system which calculates a performance target based on probability terms and which takes into consideration the current deviation from the performance target values.

The method and system achieve performance compliance by calculating a violations ratio of allowable performance violations within a set of monitoring intervals; equating the violations ratio with a corresponding probability associated with a performance probability distribution curve; determining a corresponding performance value associated with the corresponding probability; and using the performance value to calculate a performance target for use as a performance guide in the management of the power system.

BRIEF DESCRIPTION OF THE DRAWINGS

A wide variety of potential embodiments will be more readily understood through the following detailed description, with reference to the accompanying drawings in which.

DETAILED DESCRIPTION OF THE INVENTION

Figure 1:
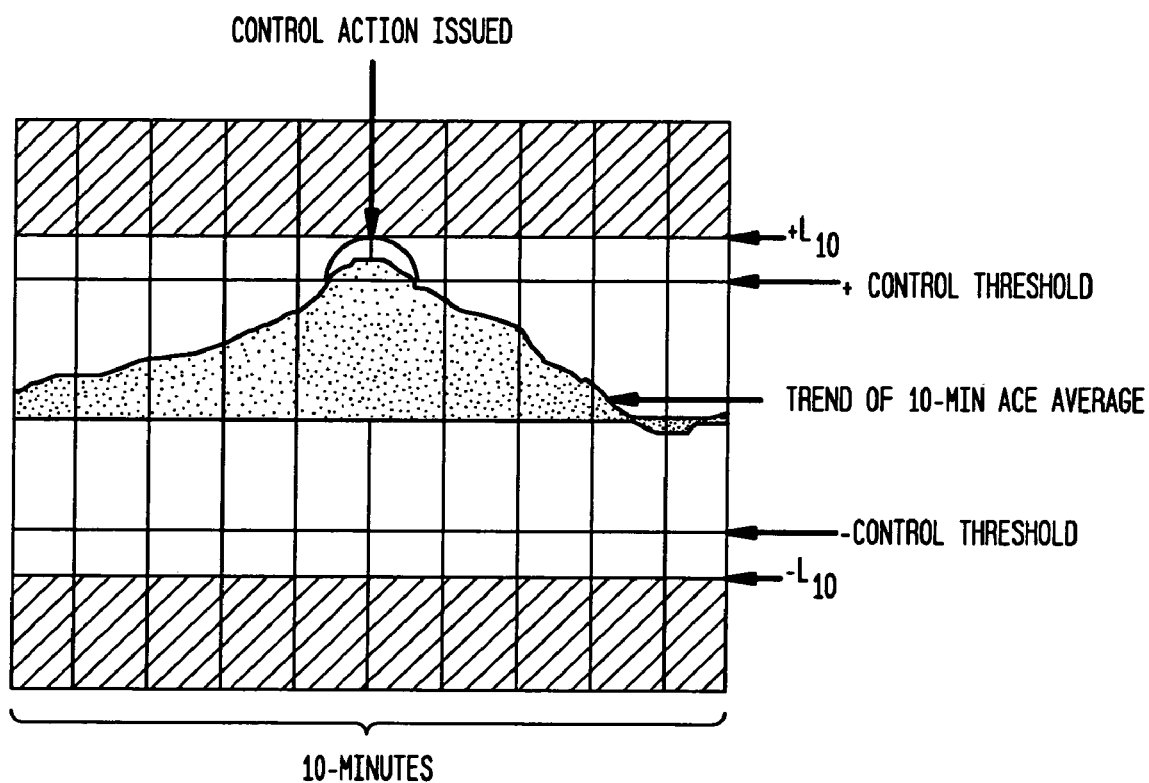
FIG. 1 is an illustration of a 10 minute interval having control threshold values and $L_{10}$ limits.

System operators have found it a challenge to readily match changes in load requirements with power generation for their control areas. Nevertheless automatic generation control systems have attempted to control this mismatch between sources of power and uses of power, by balancing real-power and by stabilizing frequency. As a guide to power and load management, NERC has provided control performance standards aimed at minimizing adverse effects on neighboring control areas. To be in compliance with these NERC requirements, a system operator must balance its generation and interchange schedules with its load.

As a measure of conformity to the control performance standards, a first compliance factor known as ACE (Area Control Error) is applied to the power system's operations. For purposes of illustration, the ACE equation is shown below in a slightly simplified form $$ACE_i = (I_A - I_S) - 10\beta(F_A - F_S) \qquad (1)$$

where $(I_A - I_S)$ refers the algebraic sum of all power (MW) flows on tie-lines between a control area and its surrounding control areas ($I_A$=actual net interchange, and $I_S$=scheduled net interchange, $(F_A - F_S)$ is the interconnection frequency (Hz) deviation ($F_A$=actual system frequency and $F_S$=scheduled system frequency), and $\beta$ is the control area's frequency bias (MW/0.1 Hz). Frequency bias is the amount of generation needed to respond to a 0.1 Hz change in interconnection frequency. It is normally set to the supply-plus-load response of a control area to a change in interconnection frequency. The first term shows how well the control area performs in matching its schedules with other control areas. The second term is the individual control area's contribution to the interconnection to maintain frequency at its scheduled value. Accordingly, $ACE_i$ is a performance standard and a guide to energy management. The $ACE_i$ value is calculated by taking the instantaneous difference between actual and scheduled interchange while taking into account the effects of frequency. It measures how well a control area manages its generation to match time-varying loads and scheduled interchange.

As a guide to performance, NERC has also defined several other minimum Control Performance standards, namely CPS1, and CPS2. CPS1 is a yearly measure of one-minute averages and is shown below:

$$CPS1 = AVG_{12-month}\left[\left(\frac{ACE_i}{-10B_i}\right)_i \Delta F_i\right] \leq \varepsilon_1^2 \qquad (2)$$

In equation 2, $ACE_i$ is the clock-minute average of ACE (tie-line bias ACE)(see equation 1), $B_i$ is the frequency bias of the control area, $\Delta F_i$ the clock-minute average frequency error, and $\epsilon_1$ is the interconnections' targeted frequency bound. CPS1 measures the relationship between ACE and interconnection frequency on a 1-minute average basis. The equation can be re-written as follows:

$$1 \geq AVG_{12-month}\left[\left(\frac{ACE_i}{-10B_i}\right)_i \Delta F_i\right] / \epsilon_1^2 \qquad (3)$$

Under CPS1, if the above equation is evaluated for the various instantaneous $ACE_i$ values, the resultant should be less than or equal to 1. Throughout the year, system operators attempt to monitor and control power generation to meet the CPS1 objective.

As a secondary NERC requirement, CPS2 performance standard requires that the average ACE for each of the six ten-minute periods during the hour must be within specific limits referred to as $L_{10}$. Under CPS2, the standard requires a 90% compliance of the 10 minute ACE averages over a month or on average, no more than 14.4 violations over a 24 hour period. Moreover, CPS2 compliance requires that the ACE ten minute average be less than or equal to the $L_{10}$ average as shown below.

$$AVG_{10-minute}ACE_i \leq L_{10} \qquad (4)$$

$L_{10}$ is calculated as follows:

$$L_{10} = 1.65 \cdot \epsilon_{10} \cdot \sqrt{(-10B_i)(-10B_s)} \qquad (5)$$

where $ACE_i$ is the instantaneous tie-line bias ACE value, 1.65 is a conversion constant used to convert the frequency target to 90% probability, $\epsilon_{10}$ is the constant derived from the targeted frequency bound. The bound $\epsilon_{10}$ is the same for every control area within an interconnection, $\beta_i$ is the frequency bias of the control area and $\beta_s$ is the sum of frequency bias settings of the control areas in the respective interconnection.

In addition, CPS2 is a monthly standard that limits unscheduled power flow. It is also a numeric measure of ACE (in MW) over all 10 minute periods within a month. Under CPS2, ACE is limited to within a band bounded by $L_{10}$ limits (see equation 5). For the most part, industry compliance of the CPS2 standard is accomplished through trend analysis or time weighted factors. Rising and waning 10 minute ACE averages are tracked and responded to by the noting the direction and slope of the collected 10 minute average data points. Action may be taken within a predefined threshold value reached prior to crossing the $L_{10}$ limits or may be set to trigger upon a detected violation of the $L_{10}$ thresholds. Although $L_{10}$ establishes CPS2 performance limits, system operators may operate within a narrower standard of performance, namely, control threshold values, so as to avoid CPS2 violations rather than reacting to $L_{10}$ violations. The control threshold values are set by system operators and determined by historical field data, power generation algorithms and variations of the $L_{10}$ equation 5. (i.e. 90% of $L_{10}$ boundaries)

For example, and as shown in FIG. 1, a snapshot of a 10 minute window reveals the occurrence of a CPS2 threshold violation (not an $L_{10}$ violation) at the 5th minute of the 10 minute interval. Under these circumstances, a system operator may take corrective action to change the ACE value away from the threshold values and $L_{10}$ limits. Whether performance is guided by $L_{10}$ limits or threshold values, is a matter of choice. The present invention may be applied to any operating band as set for by the system operator.

Unlike the above trend based corrective actions, the present invention uses a real time control strategy that is based on the foundations of probability theory. It should be understood that although the following examples focus on CPS2 compliance, the present invention is also applicable to CPS1 or any other performance standard.

CPS2 compliance means having ACE values at 90% of the time within the $L_{10}$ limits measured at 10 minute intervals and over a span of a month such that:

$$Avg_{10-minute}[ACE_i] \leq L_{10}(=L_{pr} \cdot \epsilon_{10} \cdot \sqrt{(-10B_i)(-10B_s)}) \qquad (6)$$

Because CPS2 requires a 90% compliance, it implicitly allows for a 10% violation. In other words, the total violations per month cannot exceed 10% of the total time intervals.

$$CPS2 = \frac{\text{total violations/month}}{\text{Total time intervals}} \leq 10\% \qquad (7)$$

One way to satisfy the CPS2 requirement is to decrease the ACE value when calculated ACE values violate the $L_{10}$ boundaries or when pre-established control thresholds are violated. Under one embodiment of the present invention, corrective action is determined by comparing a calculated target ACE value with an instantaneous value, the target value generally setting a narrower performance band between to $L_{10}$. When the instantaneous ACE value is less than or equal to the ACE target value, no corrective action is generally required. However when the instantaneous $ACE_i$ value is greater than the target ACE value, corrective action is necessary.

In an alternate expression of allowable CPS2 violations, compliance with the CPS2 standard may be described as the total number of current violations and remaining allowable violations over the total number of ten minute intervals, as shown below.

$$\frac{v_t + v_{T-t}}{n_t + n_{T-t}} \leq 0.1 \qquad (8)$$

In the above equation, let the current monitoring interval be denoted by t and let nt denote the current number of monitoring time intervals (valid $ACE_{10-min}$ values) within the monitoring period. Within the monitoring period, let the current cumulative $L_{10}$ violations be represented by $v_t$. Let $n_{T-t}$ denote the number of remaining monitoring intervals till the end of monitoring period or period T (one month period), and let $v_{T-t}$ represent the number of violations in the remaining monitoring intervals $n_{T-t}$.

In statistical terms, the above equation calculates and maintains a running relationship between the total allowable violations and the total number of monitoring intervals. More importantly, the above equation calculates a running number of allowable violations $v_{T-t}$ within the remaining monitoring intervals $n_{T-t}$. Accordingly, and during each remaining monitoring interval, the number of remaining allowable violations can be calculated since all other variables are known, so as to maintain a violation rate of 10% or less.

Equation 8 can be re-written in statistical terms by isolating the allowable number of violations in the remaining monitoring intervals (violations ratio) on the left-hand side of the equation as shown below.

$$\frac{v_{T-t}}{n_{T-t}} \leq 0.1 + \frac{0.1 \cdot n_t - v_t}{n_{T-t}} = p_{T-t} \quad (9)$$

As the monitoring intervals progress toward the end of a monitoring period (one month period), the number of allowable violations within the remaining monitoring intervals will fluctuate between 0 and the total allowable violations within the monitoring period.

The running violations ratio ($V_{T-t}/n_{T-t}$) in equation (9) may be viewed as a probability target ($P_{T-t}$) for the remaining time intervals. In probabilistic terms, however, CPS2 may be expressed as $$P\{|[\overline{ACE_{10}}]| \leq L_{10}\} \geq 0.9 \quad (10)$$

Where $[\overline{ACE_{10}}]$ a random variable that represents a 10-minute ACE average over 1 month. Within this embodiment and for purposes of illustration, it is assumed that the occurrence of ACE values while attempting to conform to the CPS2 standard, follows a normal distribution curve with an expectation of 0 and a standard deviation of $\sigma_{[\overline{ACE_{10}}]}$ (where $$\sigma^2_{[\overline{ACE_{10}}]} = E\{[\overline{ACE_{10}}]^2\}).$$

To simplify, $[\overline{ACE_{10}}]$ is normalized such that $ace_{10} = [\overline{ACE_{10}}]/\sigma_{[\overline{ACE_{10}}]}$.

Accordingly, $ace_{10}$ has a standard normal distribution with expectation 0 and standard deviation 1, and its probability density function is:

$$p(x) = \frac{1}{\sqrt{2\pi}} \exp\left\{-\frac{x^2}{2}\right\}. \quad (11)$$

It should be understood however, that although a standard normal distribution curve is used herein for illustrative purposes, other distribution curves may be used.

The CPS2 criteria as expressed in equation (10) may then be re-written in terms of $ace_{10}$ as follows:

$$P\{|ace_{10}| \leq L_{10}/\sigma_{[\overline{ACE_{10}}]}\} \geq 0.9 \quad (12)$$

For any non-negative y, there exists a unique and non-negative x such that $$P\{|ace_{10}| \leq x\} = \frac{1}{\sqrt{2\pi}} \int_{-x}^{x} \exp\left\{-\frac{t^2}{2}\right\} dt = y \quad (13)$$

If $L_{10}/\sigma_{[\overline{ACE_{10}}]} \geq x$, then equation (10) may be expressed as $P\{|ace_{10}| \leq x\} \geq y$ Let y be the probability target to achieve CPS2 compliance as calculated in equation (9), $$y = p_{T-t} = 0.1 + \frac{0.1 \cdot n_t - v_t}{n_{T-t}} \quad (14)$$

The normalized $ace_{10}$ target x can then be immediately computed since all other variables in equation 14 are known—that is, the y value can be calculated and then used through iterative computing, for example, to find the value for x.

$$P\{|ace_{10}| \leq x\} = \quad (15)$$
$$\frac{1}{\sqrt{2\pi}} \int_{-x}^{x} \exp\left\{-\frac{t^2}{2}\right\} dt = y = p_{T-t} = 0.1 + \frac{0.1 \cdot n_t - v_t}{n_{T-t}}$$

As shown above, $L_{10}/\sigma_{[\overline{ACE_{10}}]} \geq x$, and therefore it can be re-written as $\sigma_{[\overline{ACE_{10}}]} \leq L_{10}/x$. Since $\sigma_{[\overline{ACE_{10}}]}$ can be calculated using the average approach method (a method of obtaining an approximation of expectation of $[\overline{ACE_{10}}]^2$), we can readily calculate the CPS2 ACE-10 control target for next 10-minute as shown below.

$$\left(\sum_{i=1}^{t-1} [\overline{ACE_{10}}]_i^2 + [\overline{ACE_{10}}]_t^2\right) / (t-1) = L_{10}/x \quad (15)$$

By rearranging the terms of equation (15), the ACE control target value can be defined and calculated as follows:

$$|[\overline{ACE_{10}}]_t| = \sqrt{((t-1) \times L_{10}/x) - \sum_{i=1}^{t-1} [\overline{ACE_{10}}]_i^2} \quad (16)$$

Once the ACE control target value has been calculated, a system operator may correlate through historical data or a performance algorithm, the amount of power correction necessary to maintain the ACE values within the $L_{10}$ limits or pre-determined threshold values.

Figure 2:
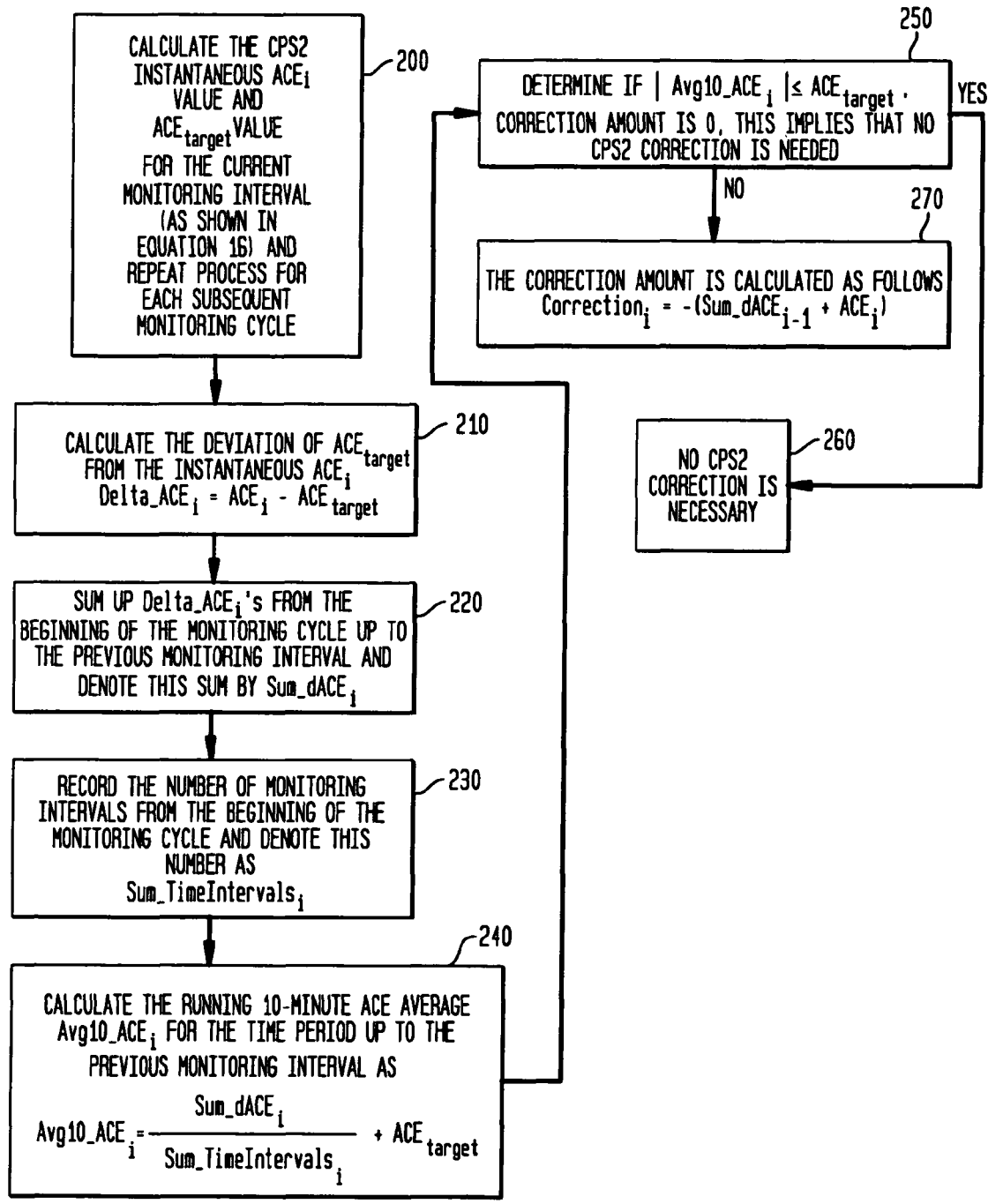
FIG. 2 is a Flow Chart detailing the process and decision for taking CPS2 corrective action.

In the present embodiment, the amount of power produced as a corrective action to comply with the CPS2 standard is based on the calculated ACE control target values and the sum of the deviations between the calculated ACE target values and the instantaneous ACE values from the beginning of a particular period such as the monthly monitoring period. Algorithmically, and as shown in FIG. 2, the amount of power to be generated to achieve CPS2 compliance requires the calculation of the ACE control target value ($ACE_{target}$) as provided for in equation 16. It should be understood that these $ACE_{target}$ values may be calculated at any period of time or interval, but are preferably calculated at the end of each monitoring interval although calculations may be done more often during each AGC monitoring cycle. The AGC monitoring cycle for a power system is the time during which performance is monitored and control signals are generated. In one embodiment of the present invention, the $ACE_{target}$ is calculated at an AGC monitoring cycle of 4 seconds, although 1 minute monitoring cycles, or any other interval may be used. Moreover, the $ACE_{target}$ values may be calculated for current, past or future (expected/predicted) time intervals and are used as reference points and performance guides.

In order to determine the type and extend of power system control necessary, and as shown in FIG. 2 step 200, the instantaneous $ACE_I$ value for the current monitoring time interval is calculated and the difference or deviation from the corresponding $ACE_{target}$ value is determined and stored in the memory of a monitoring and control system. The deviations from the $ACE_{target}$ values are algebraically calculated as shown in step 210.

$$\text{Delta\_ACE}_i = \text{ACE}_i - \text{ACE}_{target}, \quad (17)$$

During each subsequent monitoring time interval, the Delta_ACE$_i$ is once again calculated, summed and stored. These stored Delta_ACE$_i$s are summed from the first monitoring time interval to the just previous monitoring interval within the monitoring period or selected time interval of interest (although any combination or subset of the stored Delta_ACE$_i$ values may be used). In step 220, the resulting sum is denoted as Sum_dACE$_i$. The total number of monitoring time intervals from the beginning interval to the just previous interval is denoted and stored (step 230) as Sum_TimeInterrvals$_i$ In step 240, a running 10-minute ACE average Avg10_ACE$_i$ for the time period up to the current monitoring time interval is calculated as follows:

$$\text{Avg10\_ACE}_i = \frac{\text{Sum\_dACE}_i}{\text{Sum\_TimeIntervals}_i} + \text{ACE}_{target}. \quad (18)$$

To determine whether corrective action is necessary and as shown in step 250, a determination is made whether the |Avg10_ACE$_i$|≦ACE$_{target}$ is true. If |Avg10_ACE$_i$|≦ACE$_{target}$ is true, the correction amount (Mw) is 0 and therefore no CPS2 correction is needed (step 260). However, if the expression |Avg10_ACE$_i$|≦ACE$_{target}$ is not true, a correction is necessary and a correction amount needs to be determined. The correction amount is calculated from the following equation as shown in step 270.

$$\text{Correction}_i = -(\text{Sum\_dACE}_{i-1} + \text{ACE}_i). \quad (19)$$

This correction will be preferably clamped to the system allowed single cycle maximum correction in quantity without considering the sign. The first term in the expression of Correction is simply an integral action which is taken in negative feedback to reduce the integrated deviation of the instantaneous ACE from its 10-minute average ACE.

As previously alluded to, there are several performance standards by which system operators must comply. However, it should be understood that when multiple compliance standards such as CPS1 and CPS2 require simultaneous compliance, the higher priority compliance standard shall prevail. For example, since CPS2 control standard has higher priority than CPS1, if CPS2 correction and CPS1 correction are in the same direction, the larger correction amount will be used for AGC control; if CPS1 correction and CPS2 correction are in opposite directions, only CPS2 correction will be used for AGC control, and CPS1 correction is ignored; if CPS1 correction is zero and CPS2 is non-zero, CPS2 correction will be used for AGC control; if CPS2 correction is zero and CPS1 is non-zero, CPS1 correction will be used for AGC control; if both CPS1 correction and CPS2 correction are zero's, no CPS correction will be included in AGC control.

Figure 3:
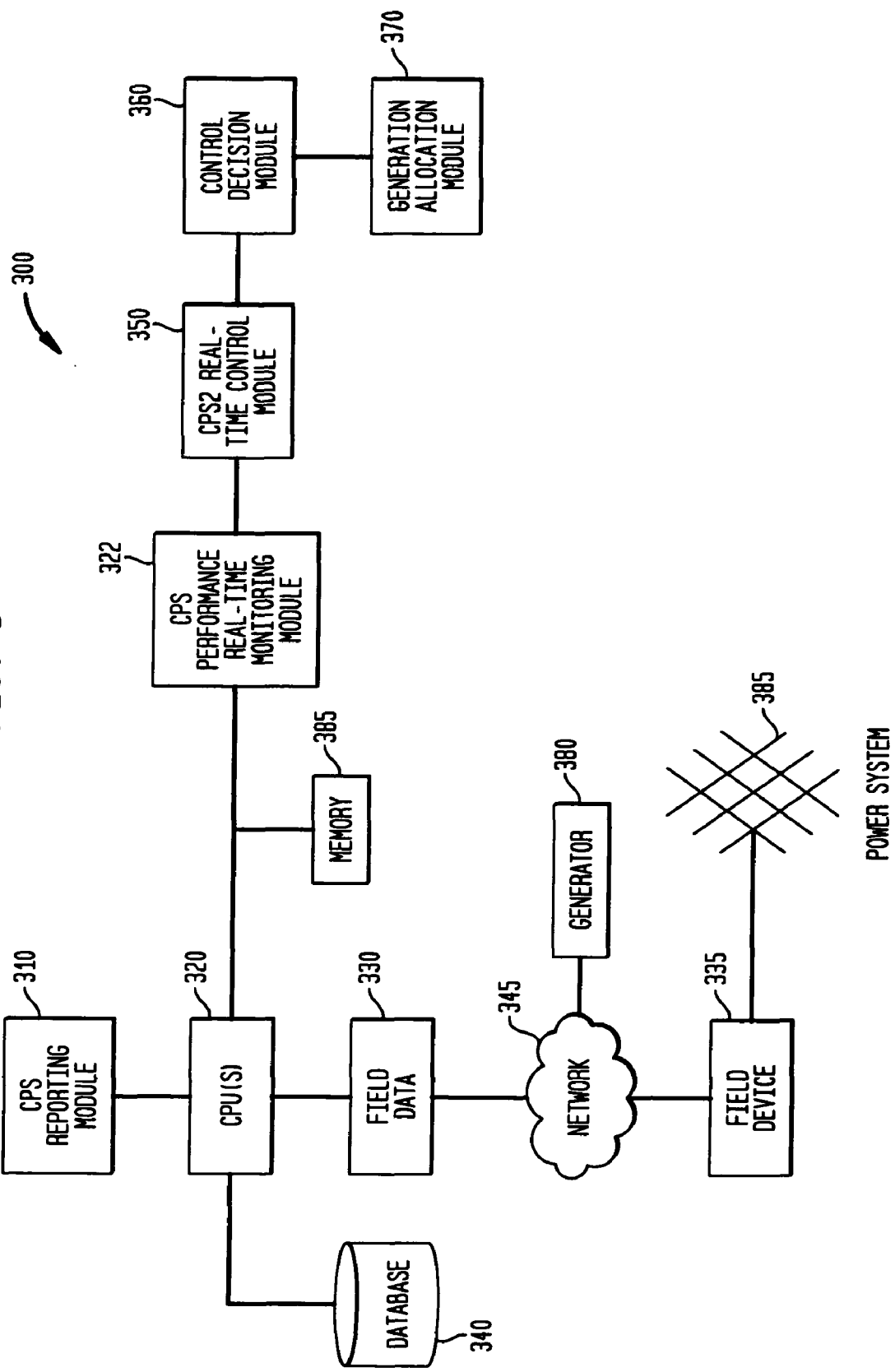
FIG. 3 is an Energy Management System.

Shown in FIG. 3 is a block diagram of an exemplary monitoring and control system 290 that incorporates the present invention. The monitoring and control system 200 as shown may be used for NERC CPS2 Compliance and comprises one or more processors 320 for the execution of monitoring and control software and operating system software. Preferably the operating system and related applications (e.g. executable code) are executed in a real-time or nearly real-time basis. Memory 390 may include one or more ROMs, PROMs, EROMs, EPROMs, RAMs, SRAMS, DRAMs, FPM DRAMS, EDO DRAMs, SDRAMs, DDR SDRAM, RDRAM, MEMORY STICKS, FLASH MEMORY, VIRTUAL MEMORY and/or electronic circuitry cable of storing program instructions and/or configuration data. Memory 390 is connected to processor(s) 320 and preferably to AGC database 340 stored on storable medium such as a hard drive, CD or diskette or any other non-volatile means of storage.

Automatic Generation Control (AGC) database 340 is connected to and accessible by the one or more processors and stores all related monitoring and control data and applications related to the monitoring and control system under operator management. From external monitoring and control devices 335 and through the monitoring and control network 345 such as a SCADA network, monitoring data is feed to a monitoring and control software module comprising CPS Performance Real-Time module 322, CPS2 Real-Time Control Module 350, Control Decision Module 360 and Generation Allocation Module 370. As used herein it should be understood that a module is a computer program functioning as either stand-alone software or software that is part of another application dedicated to the performance of a particular function.

The CPU(s) 320 forwards to CPS Performance Real-Time Monitoring Module 322, field data such as net interchange and actual frequency data necessary for the calculation of an instantaneous ACE value. The calculated instantaneous ACE value and related field data are sent to the CPS2 Performance Real-Time Control Module 322 wherein ACE$_{target}$ values, deviations from target values, summed deviations, the sum of monitoring intervals, 10 minute average ACE values and L$_{10}$ and control threshold values are calculated and stored in memory. Field and calculated data are then sent to the Control Decision Module 360, where a determination is made of the corrective action to be taken. If there is a need for corrective action, the Generation Allocation module 370 will determine or assign power system equipment or components necessary to take corrective action. If for example, additional power is necessary to maintain CPS2 compliance, CPU(s) 320 sends a generation command via the network 345 to Generator 380.

The foregoing Detailed Description of a preferred embodiment should be understood as being in every respect illustrative and exemplary. The scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A computer-implemented method of energy management in a power system comprising the steps of:
    calculating, via a processor during each of a plurality of monitoring intervals dividing a time period, a violations ratio of allowable performance violations of a control performance standard related to load balancing, wherein the violations ratio comprises an allowable number of violations remaining over the time period;
    equating by the processor the violations ratio with a corresponding probability associated with a performance probability distribution curve representing a probable occurrence of Area Control Error values when complying with the control performance standard;
    determining by the processor a corresponding performance target associated with the corresponding probability; and
    comparing the performance target with current values to determine a power correction for use as a performance guide for load balancing in the management of the power system.

2. The method of claim 1, wherein the probability distribution curve is a standard normal distribution curve representing a probable occurrence of Area Control Error (ACE) values when complying with the control performance standard that requires an average ACE value for each of a number of time intervals be within specific limits.

3. The method of claim 1, wherein the step of determining the performance target includes the step of using an iterative process.

4. The method of claim 1, further comprising the step of normalizing the probability distribution curve.

5. The method of claim 1 further comprising the step of using the performance target and an instantaneous second performance value to determine a current deviation between the performance target and the second performance value.

6. The method of claim 5, further comprising the steps of calculating deviations for previously calculated performance targets and second performance values for a plurality of monitoring intervals, and summing and storing the deviations in memory.

7. The method of claim 6, further comprising the step of calculating a deviation ratio between the summed deviations and the total number of monitoring intervals.

8. The method of claim 7, further comprising the step of summing the deviation ratio and the performance target to calculate an average performance target.

9. The method of claim 8, further comprising the step of using the average performance target to determine the actions to be taken on the power system.

10. The method of claim 9, further comprising the step of taking corrective action on the power system when the average performance target is greater than the performance target.

11. The method of claim 10, further comprising the step of calculating the power correction amount by summing the deviations and the performance target.

12. A system for energy management in a power system comprising:
- a processor for executing energy management software;
- memory connected to the processor for storing performance data;
- means for storing data connected to the processor; and
- processor executable energy management software comprising a monitoring and control module capable of:
  - calculating, during each of a plurality of monitoring intervals dividing a time period, a violations ratio of allowable performance violations of a control performance standard related to load balancing, wherein the violations ratio comprises an allowable number of violations remaining over the time period;
  - equating the violations ratio with a corresponding probability associated with a performance probability distribution curve representing a probable occurrence of Area Control Error values when complying with the control performance standard;
  - determining a corresponding performance target associated with the corresponding probability; and
  - comparing the performance target with current values to determine a power correction for use as a performance guide for load balancing in the management of the power system.

13. The system for energy management of claim 12, further comprising a monitoring and control network communicatively coupled to the processor for reporting performance data and for controlling the operation of the power system.

14. The system for energy management of claim 13, further comprising a means for generating power on the power system in communication with the monitoring and control network.

15. The system of energy management of claim 14, further comprising a field device for sensing the performance of the power system and reporting data to the processor.

16. The system of energy management of claim 15, wherein the monitoring and control module further comprises executable code for using the performance target and an instantaneous second performance value to determine a current deviation between the performance target and the second performance value.

17. The system of energy management of claim 16, wherein the monitoring and control module further comprises executable code for calculating deviations for previously calculated performance targets and second performance values for a plurality of monitoring intervals, and summing and storing the deviations in memory.

18. The system of energy management of claim 17, wherein the monitoring and control module further comprises executable code for calculating a deviation ratio between the summed deviations and the total number of monitoring intervals.

19. The system of energy management of claim 18, wherein the monitoring and control module further comprises executable code for summing the deviation ratio and the performance target to calculate an average performance target.

20. The system of energy management of claim 19, wherein the monitoring and control module further comprises executable code for using the average performance target to determine the actions to be taken on the power system.

21. A tangible computer-readable medium having stored thereon instructions which when executed by a processor, cause the processor to perform the steps of:
- calculating, during each of a plurality of monitoring intervals dividing a time period, a violations ratio of allowable performance violations of a control performance standard related to load balancing, wherein the violations ratio comprises an allowable number of violations remaining over the time period;
- equating the violations ratio with a corresponding probability associated with a performance probability distribution curve representing a probable occurrence of Area Control Error values when complying with the control performance standard;
- determining a corresponding performance target associated with the corresponding probability; and
- comparing the performance target with current values to determine a power correction for use as a performance guide for load balancing in energy management of the power system.

* * * * *